US006497325B1

(12) United States Patent
DiCesare et al.

(10) Patent No.: US 6,497,325 B1
(45) Date of Patent: Dec. 24, 2002

(54) DEVICE FOR SEPARATING COMPONENTS OF A FLUID SAMPLE

(75) Inventors: Paul DiCesare, Norwalk, CT (US); Jeffrey Karg, Hopkinton, MA (US); Fu-Chung Lin, Wayne, NJ (US)

(73) Assignee: Becton Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 09/454,267

(22) Filed: Dec. 3, 1999

Related U.S. Application Data

(60) Provisional application No. 60/110,926, filed on Dec. 5, 1998.

(51) Int. Cl.[7] ................................................ B01D 21/26

(52) U.S. Cl. ........................ 210/516; 210/513; 210/518

(58) Field of Search ................................ 210/782, 789, 210/513, 516, 518

(56) References Cited

U.S. PATENT DOCUMENTS

| | | | | | |
|---|---|---|---|---|---|
| 3,814,248 | A | * | 6/1974 | Lawhead | 210/117 |
| 3,849,072 | A | | 11/1974 | Ayres | |
| 3,897,343 | A | * | 7/1975 | Ayres | 210/516 |
| 4,083,788 | A | | 4/1978 | Ferrara | |
| 4,088,582 | A | | 5/1978 | Murty et al. | |
| 4,131,549 | A | | 12/1978 | Ferrara | |
| 4,154,690 | A | | 5/1979 | Ballies | |
| 4,257,886 | A | | 3/1981 | Kessler | |
| 4,364,832 | A | | 12/1982 | Ballies | |
| 4,426,290 | A | * | 1/1984 | Ichikawa et al. | 210/516 |
| 4,443,345 | A | | 4/1984 | Wells | |
| 4,818,386 | A | | 4/1989 | Burns | |
| 4,877,520 | A | | 10/1989 | Burns | |
| 5,269,927 | A | | 12/1993 | Fiehler | |
| 5,455,009 | A | | 10/1995 | Vogler et al. | |
| 5,575,778 | A | | 11/1996 | Hardt et al. | |
| 5,632,905 | A | | 5/1997 | Haynes | |

FOREIGN PATENT DOCUMENTS

| | | | |
|---|---|---|---|
| EP | 0 017 127 | | 3/1980 |
| EP | 0 627 261 A2 | | 6/1994 |
| EP | 0 638 804 A1 | | 8/1994 |
| JP | 6-222055 | | 8/1994 |
| WO | WO 98/51411 | * | 11/1998 |

* cited by examiner

*Primary Examiner*—John Kim
(74) *Attorney, Agent, or Firm*—Nanette S. Thomas, Esq.; Scott J. Rittman, Esq.

(57) ABSTRACT

A device and method is provided for separating heavier and lighter fractions of a fluid sample. The device includes a plurality of constituents. The constituents include a container, a liner in the container and a composite element in the liner for separating the fractions of a fluid sample. The separator comprises a specific density at a target density range as defined by separable fluid components densities. A fluid sample is delivered to the liner and then the device is subjected to centrifugation whereby the centrifugal load causes the liner to deform and the composite element migrates into the fluid sample and stabilizes between the heavier and lighter fractions of the fluid sample. The liner will resiliently return to its initial configuration upon termination of the centrifugal load such that the liner sealingly engages the composite element and separates the heavier and lighter fractions of the fluid sample.

2 Claims, 5 Drawing Sheets

DEVICE FOR SEPARATING COMPONENTS OF A FLUID SAMPLE

This application claims the benefit of U.S. Provisonal Application No.: 60/110,926 filed on Dec. 5, 1998.

BACKGROUND OF THE INVENTION

1. Field of the Invention

This invention relates to a device and method for separating heavier and lighter fractions of a fluid sample. More particularly, this invention relates to a device and method for collecting and transporting fluid samples whereby the device and fluid sample are subjected to centrifugation to cause separation of the heavier fraction from the lighter fraction of the fluid sample.

2. Description of Related Art

Diagnostic tests may require separation of a patient's whole blood sample into components, such as serum or plasma, the lighter phase component, and red blood cells, the heavier phase component. Samples of whole blood are typically collected by venipuncture through a cannula or needle attached to a syringe or an evacuated collection tube. Separation of the blood into serum or plasma and red blood cells is then accomplished by rotation of the syringe or tube in a centrifuge. Such arrangements use a barrier for moving into an area adjacent the two phases of the sample being separated to maintain the components separated for subsequent examination of the individual components.

A variety of devices have been used in collection devices to divide the area between the heavier and lighter phases of a fluid sample.

The most widely used device includes thixotropic gel materials such as polyester gels in a tube. The present polyester gel serum separation tubes require special manufacturing equipment to prepare the gel and to fill the tubes. Moreover, the shelf-life of the product is limited in that overtime globules may be released from the gel mass. These globules have a specific gravity that is less than the separated serum and may float in the serum and may clog the measuring instruments, such as the instrument probes used during the clinical examination of the sample collected in the tube. Such clogging can lead to considerable downtime for the instrument to remove the clog.

No commercially available gel is completely chemically inert to all analytes. If certain drugs are present in the blood sample when it is taken, there can be an adverse chemical reaction with the gel interface.

Therefore, a need exists for a separator device that (i) is easily used to separate a blood sample; (ii) is independent of temperature during storage and shipping; (iii) is stable to radiation sterilization; (iv) employs the benefits of a thixotropic gel barrier yet avoids the many disadvantages of placing a gel in contact with the separated blood components; (v) minimizes cross contamination of the heavier and lighter phases of the sample during centrifugation; (vi) minimizes adhesion of the lower and higher density materials against the separator device; (vii) can be used with standard sampling equipment; (viii) is able to move into position to form a barrier in less time than conventional methods and devices; and (ix) is able to provide a clearer specimen with less cell contamination than conventional methods and devices.

SUMMARY OF THE INVENTION

The present invention is a method and assembly for separating a fluid sample into a higher specific gravity phase and a lower specific gravity phase. Desirably, the assembly comprises a plurality of constituents. Preferably, the assembly of the present invention comprises a container, a liner and a composite element.

Most preferably, the container is a tube that comprises an open end, a closed end and a sidewall extending between the open end and the closed end. The sidewall comprises an outer surface and an inner surface. The tube further comprises a closure disposed to fit in the open end of the tube with a resealable septum. Alternatively, both ends of the tube may be open, and both ends of the tube may be sealed by elastomeric closures. At least one of the closures of the tube may include a resealable septum.

Most preferably, the liner comprises an open end, a closed end and a sidewall extending between the open end and the closed end. The sidewall comprises an outer surface and an inner surface. The liner is most preferably a thin wall elastomeric material. The liner is positioned in the tube such that the open end of the liner is attached to the inner surface of the tube at the open end and the closed end of the liner is near the closed end of the tube. The liner, in an unbiased condition, is cross-sectionally dimensioned along most of its length to lie in spaced relationship to the tube.

Preferably, the flexible liner comprises a qualitative stiffness that may be characterized by a non-dimensional stiffness coefficient, S* and expressed as follows:

$$S^* = \frac{E(OD - D)}{a\rho_w D^2}$$

Where E is the modulus of elasticity, OD is the thickness defined by the outside diameter, D is the seal diameter, a is the applied acceleration and $\rho_w$ is the density of water. The stiffness coefficient is about 0.003 to about 190.

Preferably, the liner has a thickness of about 1.0 mm to about 2.5 mm, a modulus of elasticity of about 13.8 MPa to about 69 MPa.

Preferably, the liner deforms due to hydrostatic pressure under applied acceleration and returns to its initial state upon removal of the acceleration, thereby forming a seal by constricting on a relatively rigid floating member which is positioned in a target density region between the higher density portion and the lower density portion of a fluid sample.

Desirably, the liner may be comprised of any natural or synthetic elastomer or mixture thereof, that are inert to the fluid sample of interest.

Preferably, the composite element is a seal body. The seal body may be a single constituent or a plurality of constituents and comprises a specific density at a target density range as defined by separable fluid components densities.

Desirably, the seal body is a substantially rigid moldable thermoplastic material such as polyvinyl chloride, polystyrene, polyethylene, polypropylene, polyester, marble and mixtures thereof that are inert to the fluid sample of interest.

Preferably, the seal body has an overall density between the densities of two phases of a blood sample.

Preferably, the seal body comprises an overall specific gravity at a target specific gravity of $\sigma_t$. The target specific gravity is that required to separate a fluid sample into two phases.

Most preferably, the seal body comprises at least one region of a specific gravity However, it is within the purview of the present invention that the seal plug may comprise at least two regions of differing specific gravities whereby at least one of the regions is higher than the target specific gravity and at least one of the regions is lower than the target specific gravity.

Preferably, the seal body may migrate freely when under an applied acceleration to settle at a location in the fluid sample in the target density region and thereby become a barrier at a desired level between the components of the fluid sample after the acceleration is removed.

Preferably, the seal body has an aggregate specific gravity of about 1.028 to about 1.09. Most preferably, the seal body has an aggregate specific gravity so that it will rest after centrifugal force, between the heavier and lighter phases of a blood sample.

Preferably, the seal body is initially secured to the bottom area of the liner by an interference fit until the assembly is subjected to centrifugation. When the assembly is subjected to centrifugation the seal body is released from the bottom of the liner. However, it is within the purview of the invention that the seal body may start at any location in the liner.

Preferably, the assembly of the present invention will function under load created by an applied acceleration of about 300 g to about 3000 g.

In use, a fluid sample enters the assembly by a needle. The needle penetrates the closure through the elastomeric septum and the sample enters the assembly through the needle and into the body of the liner. The needle is withdrawn from the assembly and the septum of the closure reseals.

The assembly is then subjected to centrifugation. Under centrifugation, forces exerted by the centrifuge cause the liner to expand outwardly against the tube, eliminating the interference fit with the seal body and the seal body migrates axially up the liner towards the open end. Therefore, a path is developed between the inner surface of the liner and the seal body that permits the flow of the high-density component past the seal body as it migrates up the liner. The centrifuge may be stopped after the seal body reaches the position between the lower density liquid component and higher density cellular/solid components, equal to its overall density. Upon terminating centrifugation, the liner resiliently returns to its undeformed shape, whereby the seal body seals against the inner wall of the liner, thereby creating a barrier between the higher and lower density components of the fluid. As a result, the phases of the fluid sample are isolated from one another by the seal body and may be separated for subsequent analysis.

The seal body's position at the bottom of the liner provides easy direct loading of the fluid sample into the liner. Thus, the fluid sample is easily delivered into the liner without any interference or disturbance.

When the fluid sample is blood, the higher specific gravity portion that contains the cellular components is between the seal body and the bottom of the liner after centrifugation. The lower specific gravity portion that contains the cell free serum fraction is between the seal body and the top of the liner. At the final position of the seal body, the seal body is able to substantially eliminate the presence of red blood cells on the seal body in the lower specific gravity portion and the lower specific gravity portion is substantially free of cellular contamination.

The assembly of the present invention is advantageous over existing separation products that use gel. In particular, the assembly of the present invention will not interfere with analytes as compared to gels that may interfere with analytes. Another attribute of the present invention is that the assembly of the present invention will not interfere with therapeutic drug monitoring analytes.

Most notably, is that the time to separate a fluid sample into separate densities is achieved in substantially less time with the assembly of the present invention as compared to assemblies that use gel.

Another notable advantage of the present invention is that fluid specimens are not subjected to low density gel residuals that are at times available in products that use gel.

A further attribute of the present invention is that there is no interference with instrument probes.

Another attribute of the present invention is that samples for blood banking tests are more acceptable than when a gel separator is used.

Another attribute of the present invention is that only the substantially cell-free serum or plasma fraction of a blood sample is exposed to the top surface of the seal body, thus providing practitioners with a clean sample.

Additionally, the assembly of the present invention does not require any additional steps or treatment by a medical practitioner, whereby a blood or fluid sample is drawn in the standard fashion, using standard sampling equipment.

DETAILED DESCRIPTION

The present invention may be embodied in other specific forms and is not limited to any specific embodiments described in detail, which are merely exemplary. Various other modifications will be apparent to and readily made by those skilled in the art without departing from the scope and spirit of the invention. The scope of the invention will be measured by the appended claims and their equivalents.

Figure 1:
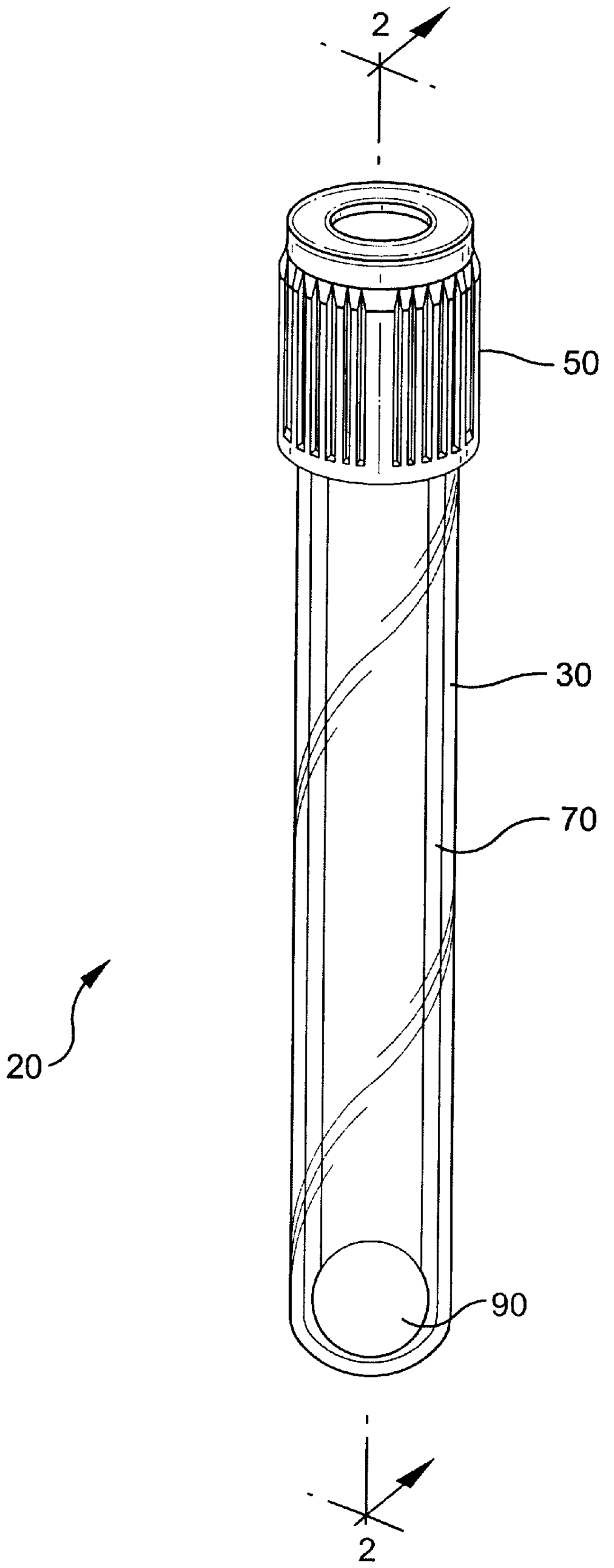
FIG. 1 is a perspective view of the assembly of the present invention.
Figure 2:
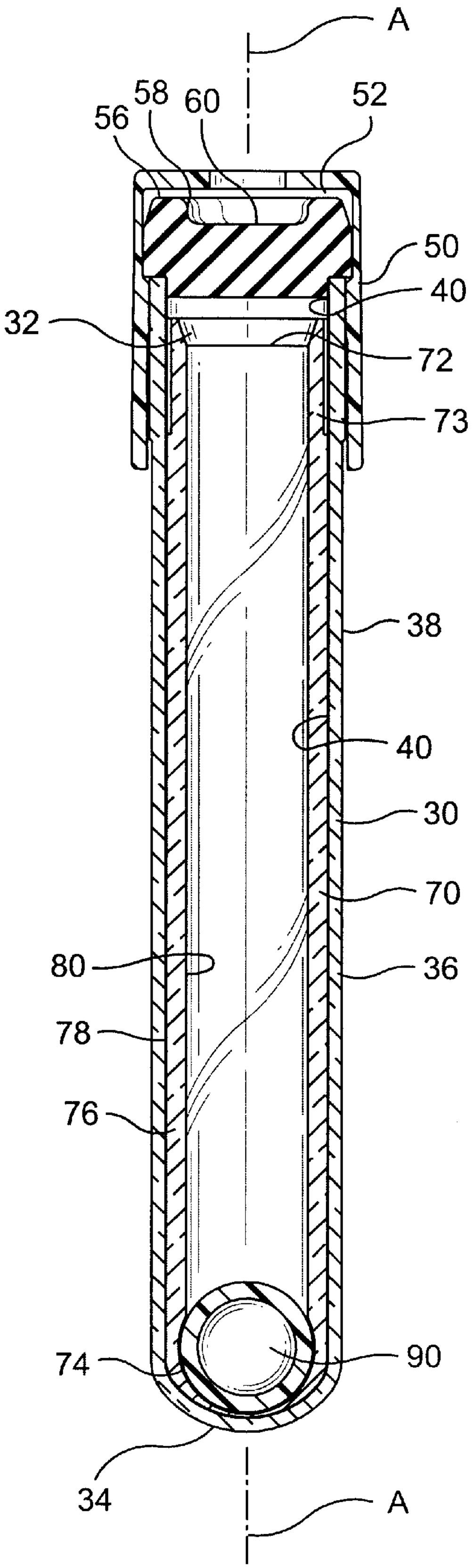
FIG. 2 is a longitudinal sectional view of the assembly of FIG. 1 taken along line 2—2 thereof.

The preferred apparatus of the present invention is illustrated in FIGS. 1 to 2, wherein assembly 20 comprises a tube 30, a closure 50, a flexible liner 70 and a seal body 90.

Tube 30 has an open end 32, a closed end 34 and a sidewall 36 extending between the open end and the closed end. Sidewall 36 has an outer surface 38 and an inner surface 40. Tube 30 defines a receptacle with a central axis "A".

Tube 30 is preferably made from a substantially transparent and rigid material. Suitable materials for the tube include glass, polystyrene, polyethyleneterephthalate, polycarbonate and the like.

Closure 50 is disposed to fit over open end 32 of tube 30. Closure 50 comprises an annular upper portion 52 that includes a top surface area 56, and a sidewall 58 that converges from surface area 56 towards an upper well area 60. Well area 60 is most preferably a thin diaphragm or a self sealing septum for directing and receiving the point of a needle to be inserted into and through the stopper.

Well area 60 defines a thin diaphragm or self-sealing septum through which a needle may be inserted. The self sealing septum material allows penetration by a piercing element such as a needle and then reseals when the piercing element is withdrawn.

Preferably, the closure may be made of natural rubber elastomer, synthetic thermoplastic and thermoset elastomeric materials. Preferably, the closure is made of a resilient elastomeric material whereby the septum is self-sealing.

As shown in FIGS. 1 and 2, flexible liner 70 has an open end 72 that includes a top portion 73 that is secured to the inner surface of tube 30. Liner 70 further includes a closed end 74 and a sidewall 76 extending between the open end and the closed end. Sidewall 76 has an outer surface 78 and an inner surface 80. More particularly, outer surface 78 of top portion 73 is secured to inner surface 40 of tube 30. An interference fit, an adhesive or the like may be used to secure them together.

Liner 70 may be made from hydrophilic polyurethane, ethylene-octene copolymer, ethylene-butene copolymer and the like.

Seal body 90 may be of any particular geometric configuration. For purposes of illustration, seal body 90 as shown in FIGS. 1 and 2 as a round body. It is within the purview of the invention that seal body 90 may be hollow, solid or some combination thereof provided that the density of seal body 90 is appropriate to separate higher and lower density fluid components.

Figure 3:
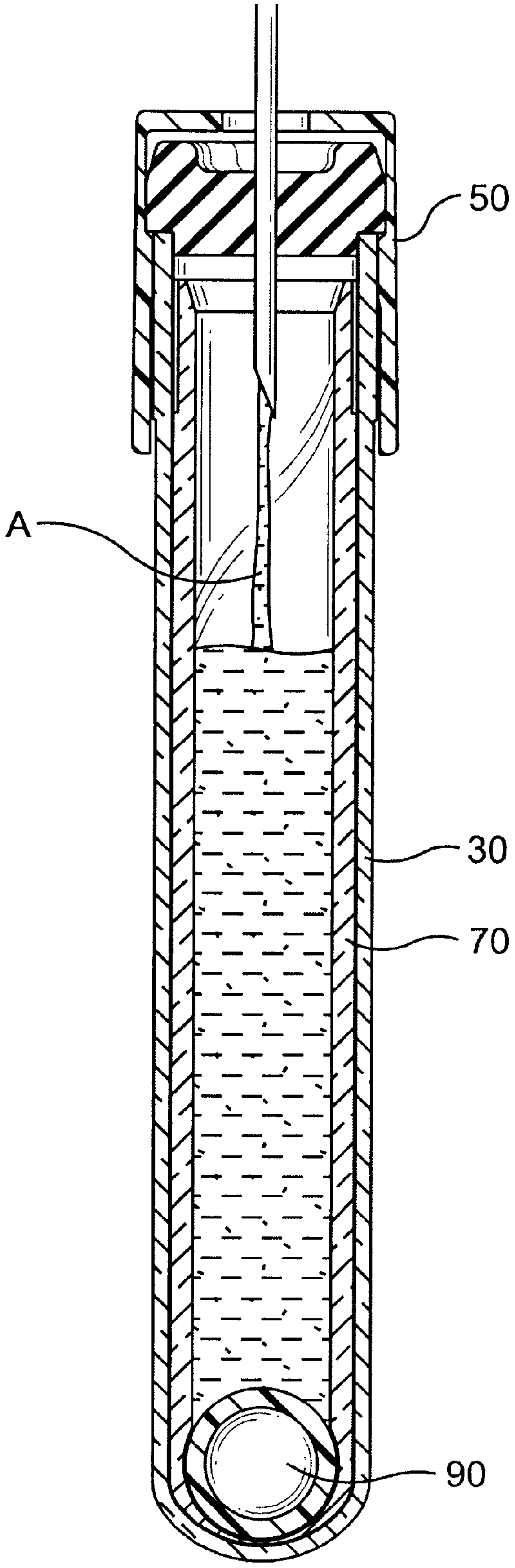
FIG. 3 is the longitudinal sectional view of the assembly of FIG. 2 illustrating fluid delivery into the assembly by a needle.

As shown in FIGS. 2 and 3, seal body 90 is initially nested in closed end 74 of liner 70. Seal body 90 is held securely by the liner in its undeformed state. As shown in FIGS. 2 and 3, seal body 90 and the inner wall of the liner form an interference fit.

As shown in FIG. 3, a fluid sample A is delivered to the tube by a needle that penetrates closure 50 in upper well area 60. For purposes of illustration only, the fluid sample is blood.

Figure 4:
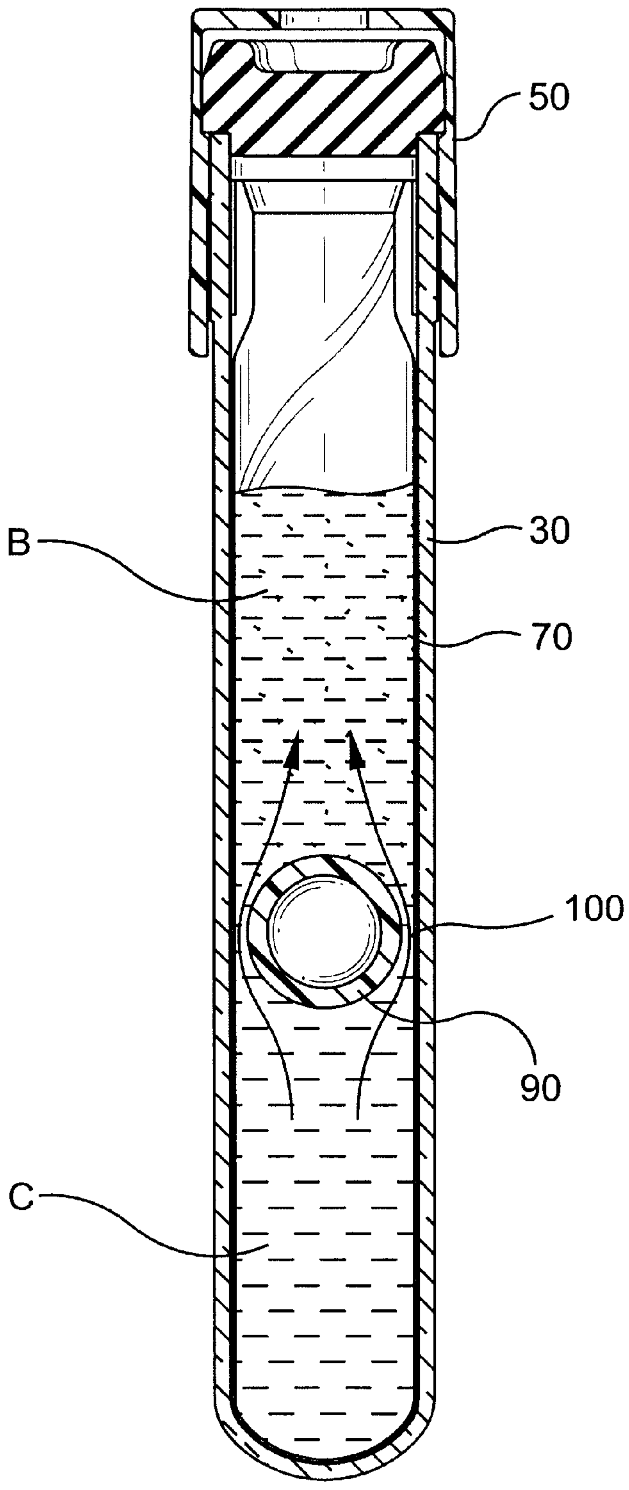
FIG. 4 illustrates the assembly under centrifugation and the release of the seal body from the liner.

As shown in FIG. 4 when assembly 20 is subjected to centrifugation, the sidewall of liner 70 deflects eliminating its interference with the seal body, the seal body releases from the liner and moves towards open end 32 of tube 30. As the seal body moves upwardly, a higher specific gravity fraction C of fluid sample A moves downwardly past the seal body.

As shown in FIG. 4 as the seal body moves upwardly and the liner deflects, a path 100 opens between the liner and the seal body, permitting the flow of the low density component of the fluid past the seal body as the seal body migrates up the liner. The high-density component will migrate downwardly past the seal body toward the closed end of the liner.

Figure 5:
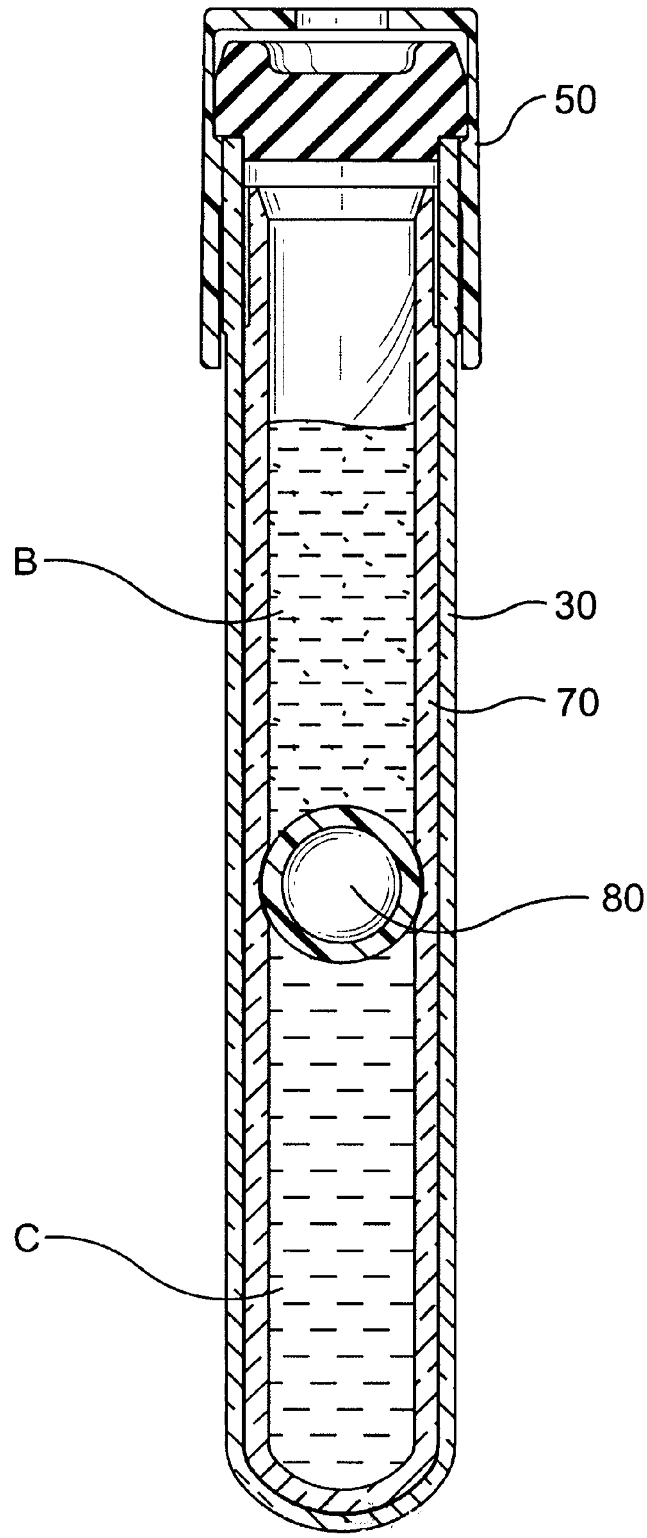
FIG. 5 illustrates the assembly after centrifugation and the separation of the fluid sample into higher and lower specific gravities.

As illustrated in FIG. 5, after centrifugation is complete, the liner returns to its undeformed shape, and the seal body seals against the inner wall of the liner, whereby seal body 90 serves as a divider between lower specific gravity portion B and higher specific gravity portion C of the fluid sample.

Liner 70 is compatible with most of the numerous additives used in sample collection tubes such as citrates, silicates, EDTA and the like that are used to condition a fluid sample either to facilitate or retard clotting, or to preserve the fluid sample for a particular analysis. It is within the purview of this invention that one or more additives may be used in the present invention for particular applications.

What is claimed is:

1. An assembly for separating a fluid sample into a higher specific gravity phase and a lower specific gravity phase comprising:

a movable separator element having a density for positioning said separator element between a lower specific gravity phase and a higher specific gravity phase of said fluid sample and thereby separating said fluid sample between the respective densities of the phases of said fluid sample upon centrifugation;

a tube comprising an open end, a closed end and a sidewall extending between said open end and said closed end, said sidewall comprising an outer surface and an inner surface;

a closure disposed to fit in said open end of said tube; and an elastomeric liner comprising an open end with a top portion, a closed end and a sidewall extending between said open end and said closed end, said sidewall comprising an outer surface and an inner surface, whereby said top portion of said outer surface of said liner is attached to said inner surface of said tube at said open end of said tube and said separator element is held within said liner by an interference fit between said separator element and the inner surface of the liner.

2. The assembly of claim 1, wherein a portion of said tube closure is sealingly engaged in said open end of said liner and urges said outer surface of said top portion of said liner into sealing engagement with said inner surface of said sidewall of said tube.

* * * * *